United States Patent
Cherkasova et al.

(10) Patent No.: US 6,546,473 B2
(45) Date of Patent: Apr. 8, 2003

(54) METHOD FOR CACHE REPLACEMENT OF WEB DOCUMENTS

(75) Inventors: Ludmila Cherkasova, Sunnyvale, CA (US); Gianfranco Ciardo, Williamsburg, VA (US)

(73) Assignee: Hewlett-Packard Company, Palo Alto, CA (US)

( * ) Notice: Subject to any disclaimer, the term of this patent is extended or adjusted under 35 U.S.C. 154(b) by 112 days.

(21) Appl. No.: 09/870,060

(22) Filed: May 29, 2001

(65) Prior Publication Data

US 2002/0184448 A1 Dec. 5, 2002

(51) Int. Cl.[7] .............................................. G06F 12/00
(52) U.S. Cl. ...................... 711/158; 711/133; 711/134; 709/219
(58) Field of Search ...................... 711/133–134, 118, 711/151, 156, 158; 709/219, 310–320, 203

(56) References Cited

U.S. PATENT DOCUMENTS

| | | | | |
|---|---|---|---|---|
| 6,012,126 A | * | 1/2000 | Aggarwal et al. | 711/133 |
| 6,266,742 B1 | * | 7/2001 | Challenger et al. | 711/133 |
| 6,415,368 B1 | * | 7/2002 | Glance et al. | 711/158 |
| 6,425,057 B1 | * | 7/2002 | Cherkasova et al. | 711/134 |

* cited by examiner

Primary Examiner—Do Hyun Yoo
Assistant Examiner—Nasser Moazzami

(57) ABSTRACT

A method for determining the priority of documents in a web cache. The present invention incorporates the document size and the frequency of file access in determining which documents to keep in the cache and which documents to replace. The priority of a document is determined using a ratio of the frequency of access of the document raised to a first value to the size of the document raised to a second value, wherein the first value and the second value are rational numbers other than one. In one embodiment, the first value is greater than one and the second value is less than one. In another embodiment, the age of the document is also considered in determining the priority of a document. In the present embodiment, the ratio is added to a clock value, wherein the clock value is a running counter associated with the document starting at the time the document was first stored in the web cache.

33 Claims, 6 Drawing Sheets

METHOD FOR CACHE REPLACEMENT OF WEB DOCUMENTS

FIELD OF INVENTION

The present invention relates to the field of computer systems. Specifically, the present invention relates to a method of prioritizing documents in a web cache for efficient replacement.

BACKGROUND OF THE INVENTION

A web cache is a computer system located at the client, at the server, or at the network that keeps copies of the most-recently requested web pages in memory or on disk in order to speed up retrieval. Document caching is used to improve web performance. If a user requests a page that has already been stored in the cache, it is retrieved locally rather than from the Internet, thus resulting in faster file retrieval. A web cache has a limited amount of memory in which to store web pages. As a result, documents in the web cache must be periodically replaced with more popular documents.

An efficient cache replacement policy keeps popular documents in the cache and replaces rarely used ones. Many replacement policies for web caches have been proposed and are currently in use. Some of them are quite simple and easy to implement, while others are heavily parameterized or have aspects that do not allow for an efficient implementation (thus they can exhibit good results that serve as theoretical bounds on the best practically achievable performance). Two essential features distinguish web caching from conventional caching in general computer systems:

The HTTP protocol supports whole file transfers, thus a web cache can satisfy a request only if the entire file is cached.

Documents stored in a web cache are of different sizes, while CPU and disk caches deal with uniform-size pages.

A key element to good web cache performance is an efficient cache replacement policy for determining which files should be removed from cache to store newly requested documents. Further improvements can be achieved when such a policy is combined with a decision about whether a document is worth caching at all.

One previously proposed cache replacement policy for web documents is the Least-Recently-Used (LRU) method. The LRU policy is based simply on a clocking function that determines the file in the web cache that is the least recently accessed file. This file is evicted from the web cache to make room for the new file.

Another previously proposed cache replacement policy for web documents is the Greedy-Dual-Size (GDS) method. The GDS policy incorporates document size, cost, and an elegant aging mechanism in the decision process, and exhibits better performance compared to the LRU policy. However, it does not account for the number of times the requested file has been accessed.

The GDS policy has been extended, taking into consideration the document frequency, resulting in the Greedy-Dual-Frequency (GDF) policy, which considers a document's frequency plus the aging mechanism, and the Greedy-Dual-Frequency-Size (GDFS) policy, which also considers a document's size.

The typical measure of web cache efficiency is the file hit ratio: the fraction of times (over all accesses) the file was found in the cache. Since files are of different size, a complementary metric is also important, the byte hit ratio: the fraction of "bytes" returned from the cache among all the bytes accessed. While the GDFS policy achieves the best file hit ratio, it yields a modest byte hit ratio. Alternatively, the GDF policy results in the best byte hit ratio at the price of a worse file hit ratio.

Accordingly, a need exists for a more efficient replacement policy for a web cache. A need exists for a web replacement policy that allows for the optimization of both the file hit ratio and the byte hit ratio. Specifically, a need exists for an efficient web cache replacement policy that allows to emphasize (or de-emphasize) either the size or frequency (or both) parameters.

SUMMARY OF THE INVENTION

A method for determining the priority of a file in a web cache for use in a web cache replacement policy is described. The present invention provides a more efficient replacement policy for a web cache. The present invention provides a web replacement policy that allows for the optimization of both the file hit ratio and the byte hit ratio. The present invention allows for either the size or frequency (or both) parameters to be emphasized or de-emphasized, producing a more efficient web cache policy.

The present invention incorporates the document size and the frequency of file access in determining which documents to keep in the cache and which documents to replace. The priority of a document is determined using a ratio of the frequency of access of the document raised to a first value to the size of the document raised to a second value, wherein the first value and the second value are rational numbers other than one. Setting the values of the first value or the second value as greater than one emphasizes the role of the associated parameter. Similarly, setting the values of the first value or the second value as less than one de-emphasizes the role of the associated parameter. In one embodiment, the first value is greater than one and the second value is less than one.

In another embodiment, the age of the document is also considered in determining the priority of a document. In the present embodiment, the ratio is added to a clock value, wherein the clock value is a running counter associated with the document starting at the time the document was first stored in the web cache. In one embodiment, the clock value can be set to any monotonically increasing function to accommodate different aging mechanisms.

In one embodiment, the priority is determined by adding the ratio, a clock value, and the frequency of access. In another embodiment, the priority is determined by adding the ratio, a clock value, and the frequency of access, wherein the frequency raised to a first value equals one.

The present invention is a generalized method for assigning priority values to documents stored in a web cache. The priority value is used to determine which document or documents are to be replaced when new documents are added to the web cache. The present invention allows for the balancing of the emphasis of the frequency of access or document size. The present invention also allows for the design of faster or slower aging mechanisms. The present invention operates to define the family of web replacement policies balancing the impact of size and frequency of access such that both parameters can be optimized.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "requesting", "determining", "serving", "adding", "performing", "storing" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
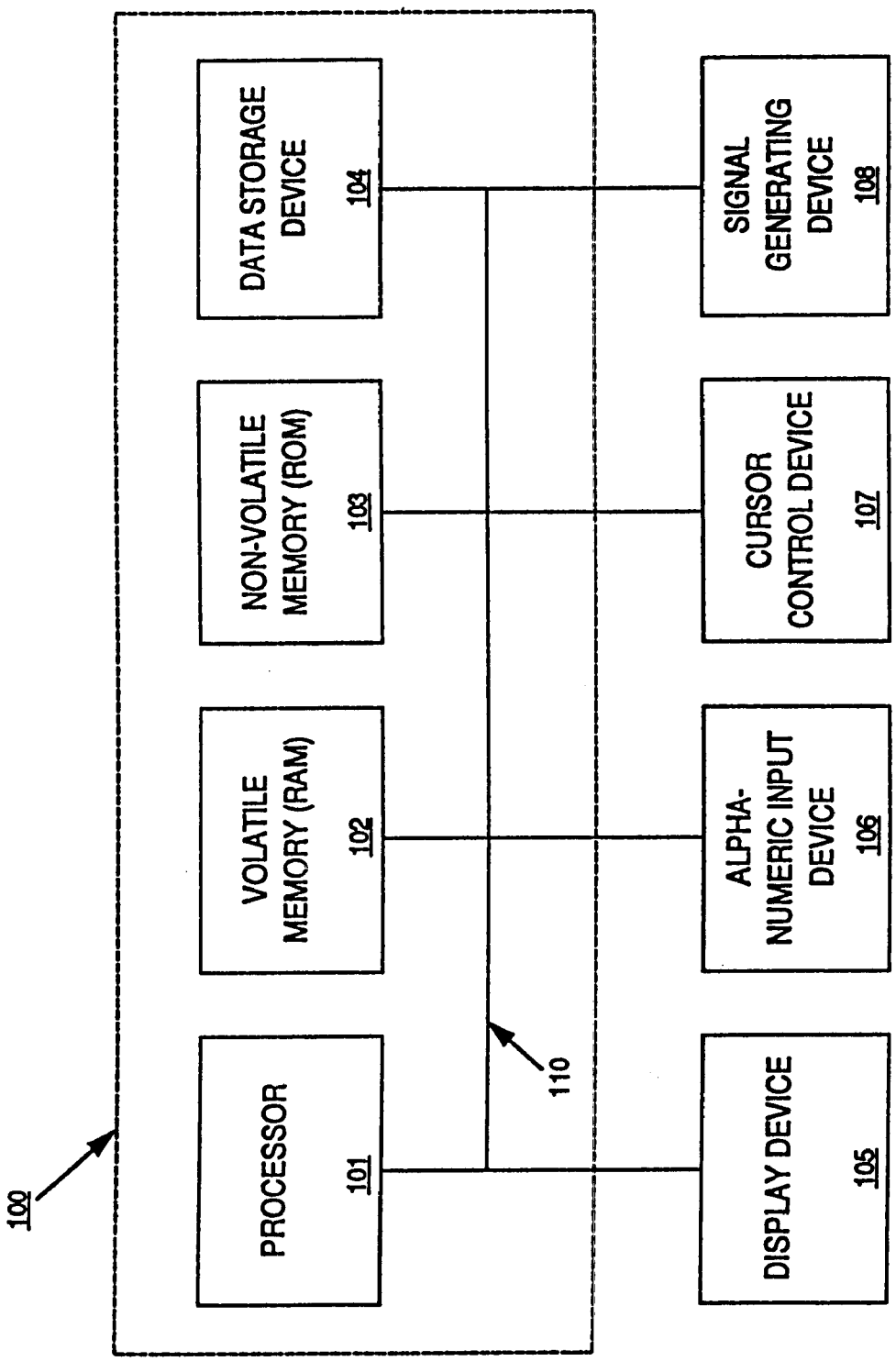
FIG. 1 illustrates an exemplary computer system platform upon which embodiments of the present invention may be practiced.

Refer now to FIG. 1 which illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions, an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
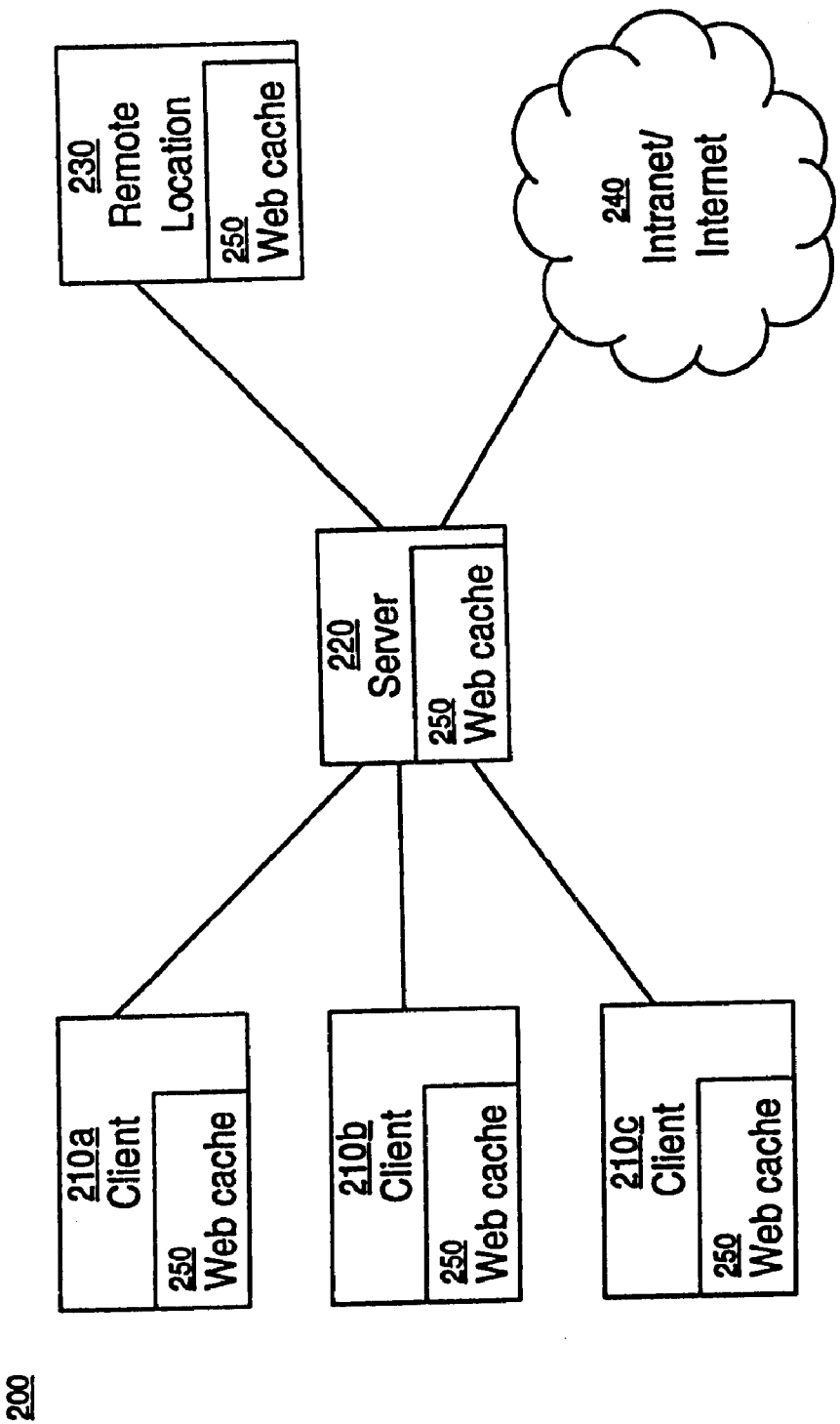
FIG. 2 is a block diagram of an exemplary computer system network upon which embodiments of the present invention may be implemented.

FIG. 2 is a block diagram of an exemplary computer system network upon which embodiments of the present invention may be implemented. Computer system network 200 comprises clients 210a, 210b, and 210c, server 220, remote location 230, and Intranet/Internet 240. In one embodiment, clients 210a, 210b, and 210c, through server 220, communicate with Intranet/Internet 240.

Clients 210a, 210b, and 210c can be any number of electronic computing devices. In one embodiment, clients 210a, 210b, and 210c are computer system with web-browsing capabilities. It should be appreciated that there can be any number of client devices, and that clients 210a, 210b, and 210c are exemplary in nature. In one embodiment, any combination of clients 210a, 210b, and 210c comprise web cache 250.

Server 220 ma y be a web server or a proxy server. In one embodiment, server 220 comprises web cache 250. In another embodiment, web cache 250 resides in remote location 230 of computer system network 200.

It should be appreciated that the possible location of the web cache can be at client 210a, 210b, or 210c, at server 220, or at remote location 230 in the network.

Figure 3:
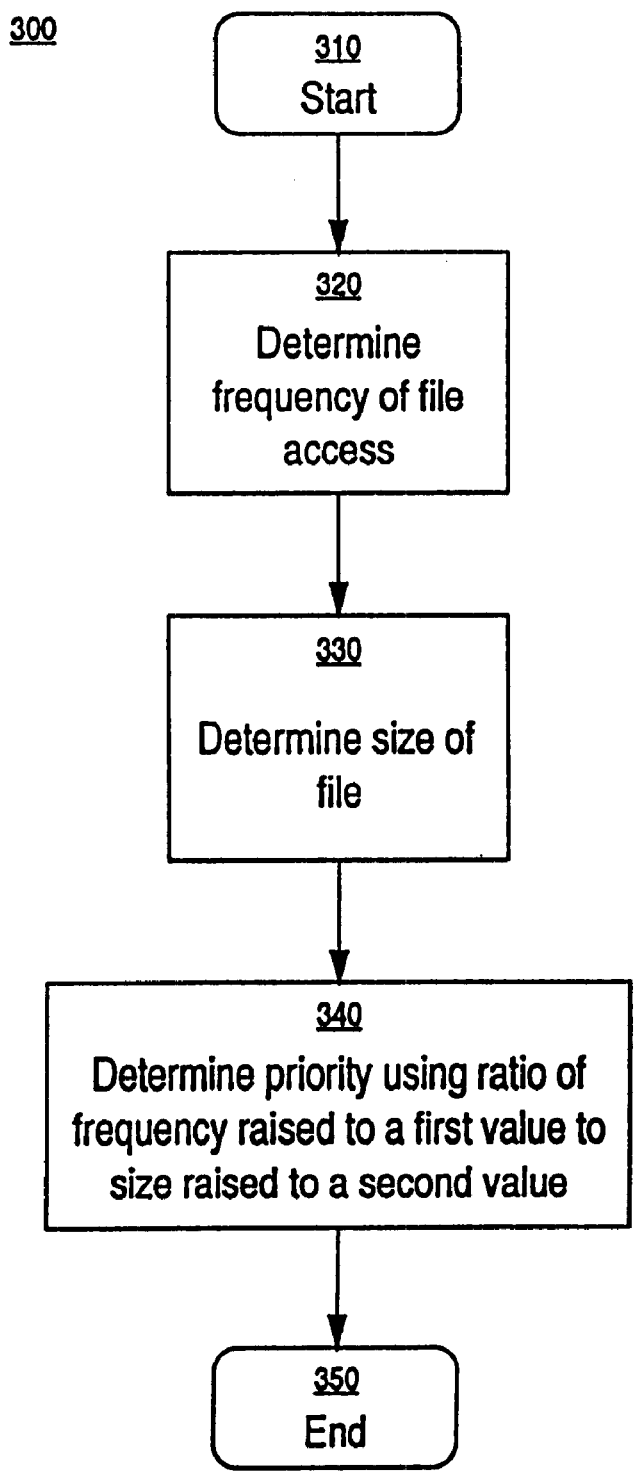
FIG. 3 shows a flowchart diagram of a process for determining the priority of a file in a web cache in accordance with one embodiment of the present invention.

FIG. 3 shows a flowchart diagram of a process 300 for determining the priority of a file in a web cache in accordance with one embodiment of the present invention. In one embodiment, process 300 is performed on every file in a web cache. In another embodiment, process 300 is performed on a file after its most recent access. As such, the priority assigned to a file is updated each time the file is accessed.

At step 310, process 300 begins. At step 320, the number of times the file has been accessed since it was saved in the web cache is determined. The number of accesses is the frequency of file access.

At step 330, the number of bytes comprising the file is determined. The number of bytes is the size of the file.

At step 340, the priority is determined by using the ratio of the frequency raised to a first value to the size raised to a second value, wherein the first value and the second value are rational numbers other than one. Setting the first value or second value as greater than one emphasizes the role of the associated parameter. Likewise, setting the first value or second value as less than one de-emphasizes the role of the associated parameter. In a preferred embodiment, the first value is greater than one (e.g., 2, 5, 10) and the second value is less than one (e.g., 0.1, 0.3, 0.5).

At step 350, process 300 ends for a particular file. It should be appreciated, as previously described, that process 300 is performed on every file in the web cache each time it is accessed. The priority for each file is used to determine which files are replaced in a web cache to make room for new files (see process 500, infra).

$$Pr(f) = \frac{Fr(f)^\alpha}{Size(f)^\beta} \qquad \text{Equation 1}$$

Equation 1 is a representation of process 300 of FIG. 3, wherein Pr(f) is the priority of the file, Fr(f) is the number of times the file has been accessed since it was stored in the web cache, Size(f) is the number of bytes comprising the file, $\alpha$ is a rational number other than one; and $\beta$ is a rational number other than one. In one embodiment, $\alpha$ is greater than one; and $\beta$ is less than one.

Figure 4:
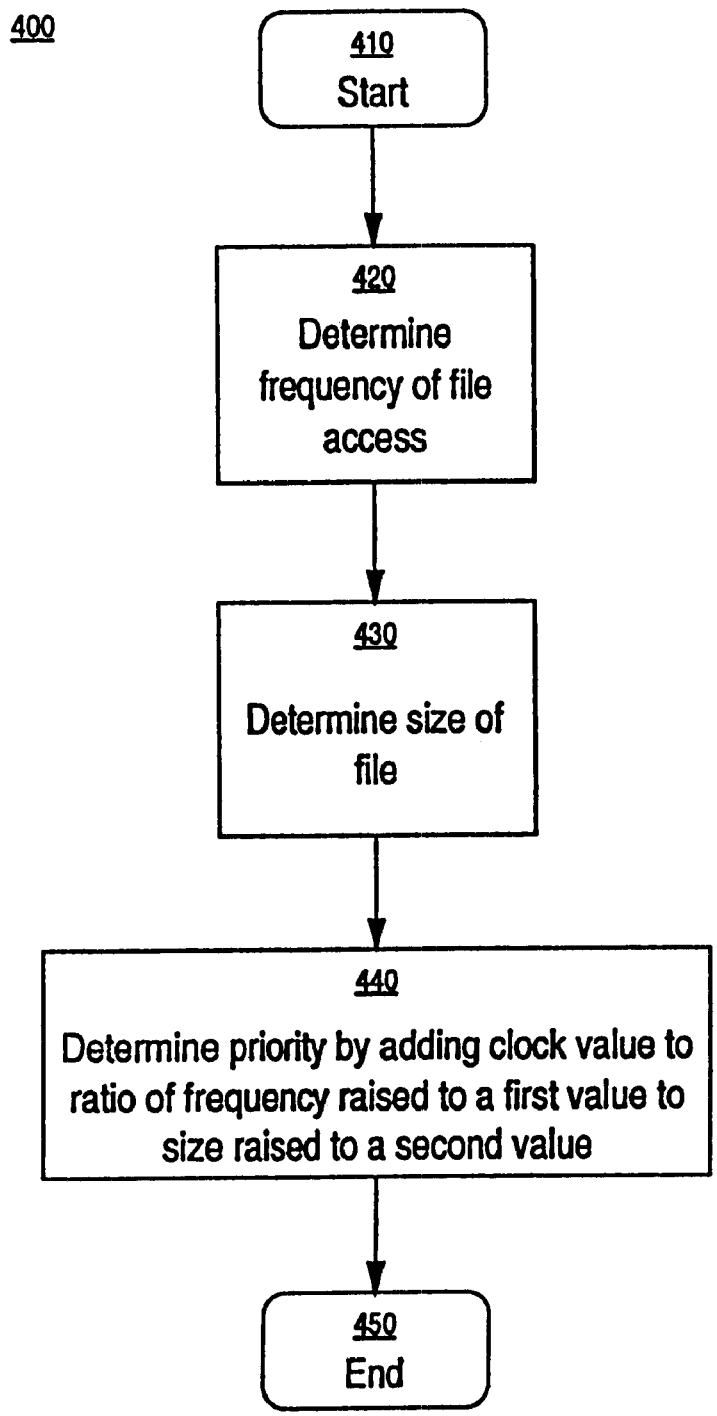
FIG. 4 shows a flowchart diagram of a process for determining the priority of a file in a web cache incorporating a clocking mechanism in accordance with one embodiment of the present invention.

FIG. 4 shows a flowchart diagram of a process 400 for determining the priority of a file in a web cache incorporating a clocking mechanism in accordance with one embodiment of the present invention. In one embodiment, process 400 is performed on every file in a web cache. In another embodiment, process 400 is performed on a file after its most recent accessing. As such, the priority assigned to a file is updated each time the file is accessed.

At step 410, process 400 begins. At step 420, the number of times the file has been accessed since it was saved in the web cache is determined. The number of accesses is the frequency of file access.

At step 430, the number of bytes comprising the file is determined. The number of bytes is the size of the file.

At step 440, the priority is determined by adding a clock value to the ratio of the frequency raised to a first value to the size raised to a second value, wherein the first value and the second value are rational numbers other than one. Setting the first value or second value as greater than one emphasizes the role of the associated parameter. Likewise, setting the first value or second value as less than one de-emphasizes the role of the associated parameter. In a preferred embodiment, the first value is greater than one (e.g., 2, 5, 10) and the second value is less than one (e.g., 0.1, 0.3, 0.5).

In one embodiment, the clock value is a running queue clock that starts at zero and is updated, for each replaced file, to its priority in the queue. In one embodiment, the clock value can be set to any monotonically increasing function to accommodate different aging mechanisms. Operating a faster increasing aging mechanism leads to a replacement policy where age has a greater impact than size or frequency.

At step 450, process 400 ends for a particular file. It should be appreciated, as previously described, that process 400 is performed on every file in the web cache each time it is accessed. The priority for each file is used to determine which files are replaced in a web cache to make room for new files (see process 500, infra).

$$Pr(f) = Clock + \frac{Fr(f)^\alpha}{Size(f)^\beta} \qquad \text{Equation 2}$$

Equation 2 is a representation of process 400 of FIG. 4, wherein Pr(f) is the priority of the file, Clock is a running counter associated with the file starting at the time said file was stored in said web cache, Fr(f) is the number of times the file has been accessed since it was stored in the web cache, Size(f) is the number of bytes comprising the file, $\alpha$ is a rational number other than one; and $\beta$ is a rational number other than one. In one embodiment, $\alpha$ is greater than one; and $\beta$ is less than one.

$$Pr(f) = Clock + Fr(f) + \frac{Fr(f)^\alpha}{Size(f)^\beta} \qquad \text{Equation 3}$$

Equation 3 represents a useful extension of Equation 2.

$$Pr(f) = Clock + Fr(f) + \frac{1}{Size(f)^\beta} \qquad \text{Equation 4}$$

Equation 4 represents another useful extension of Equation 2.

$$Clock = (int)\left(\max_{i=1}^{k} Pr(f_i)\right) \qquad \text{Equation 5}$$

Equation 5 represents an embodiment of the present invention where the clock value is computed as an integer part of the evicted document priority.

Figure 5A:
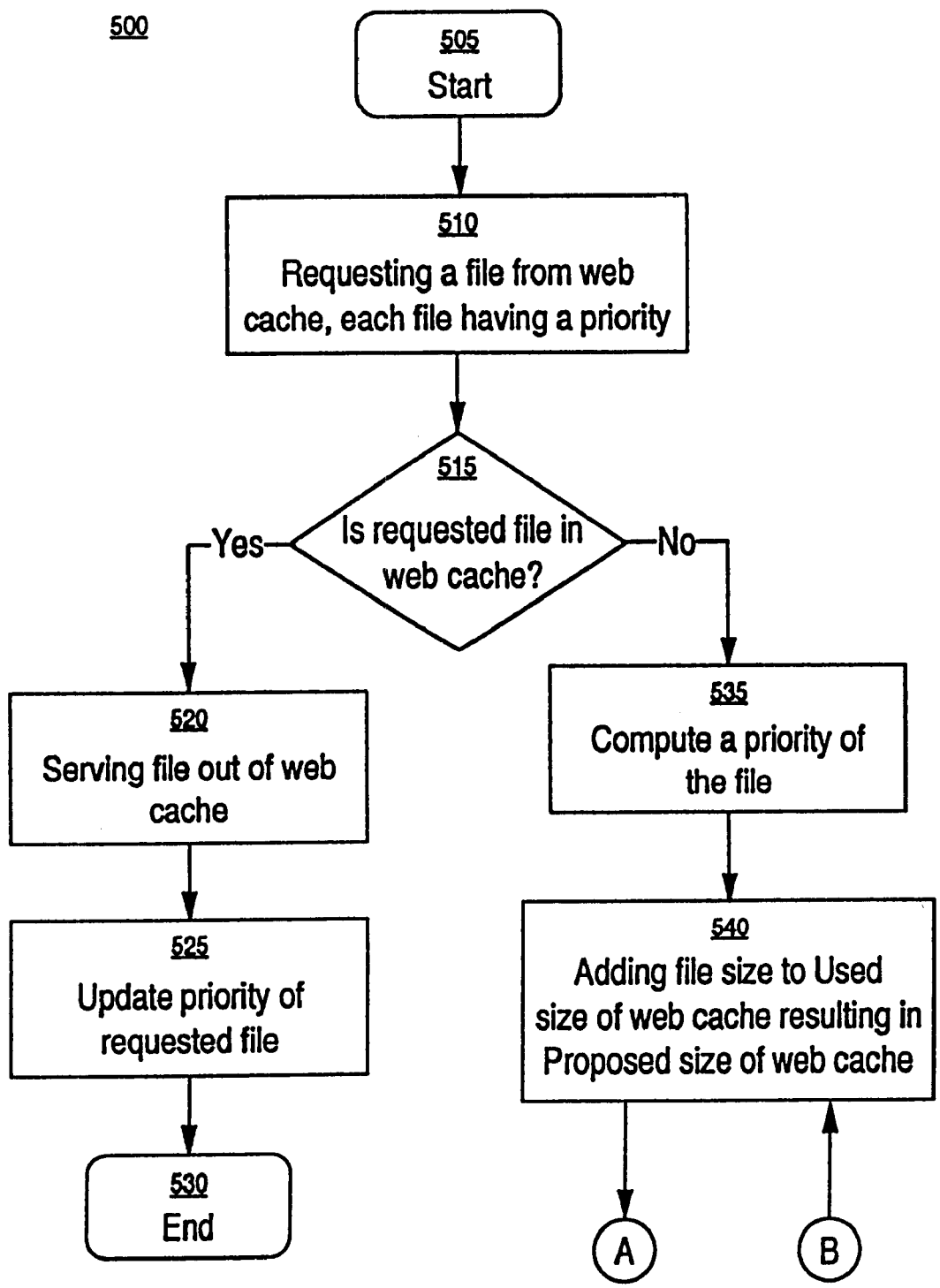
FIGS. 5A and 5B show a flowchart diagram of a process for replacement of files in a web cache in accordance with one embodiment of the present invention.
Figure 5B:
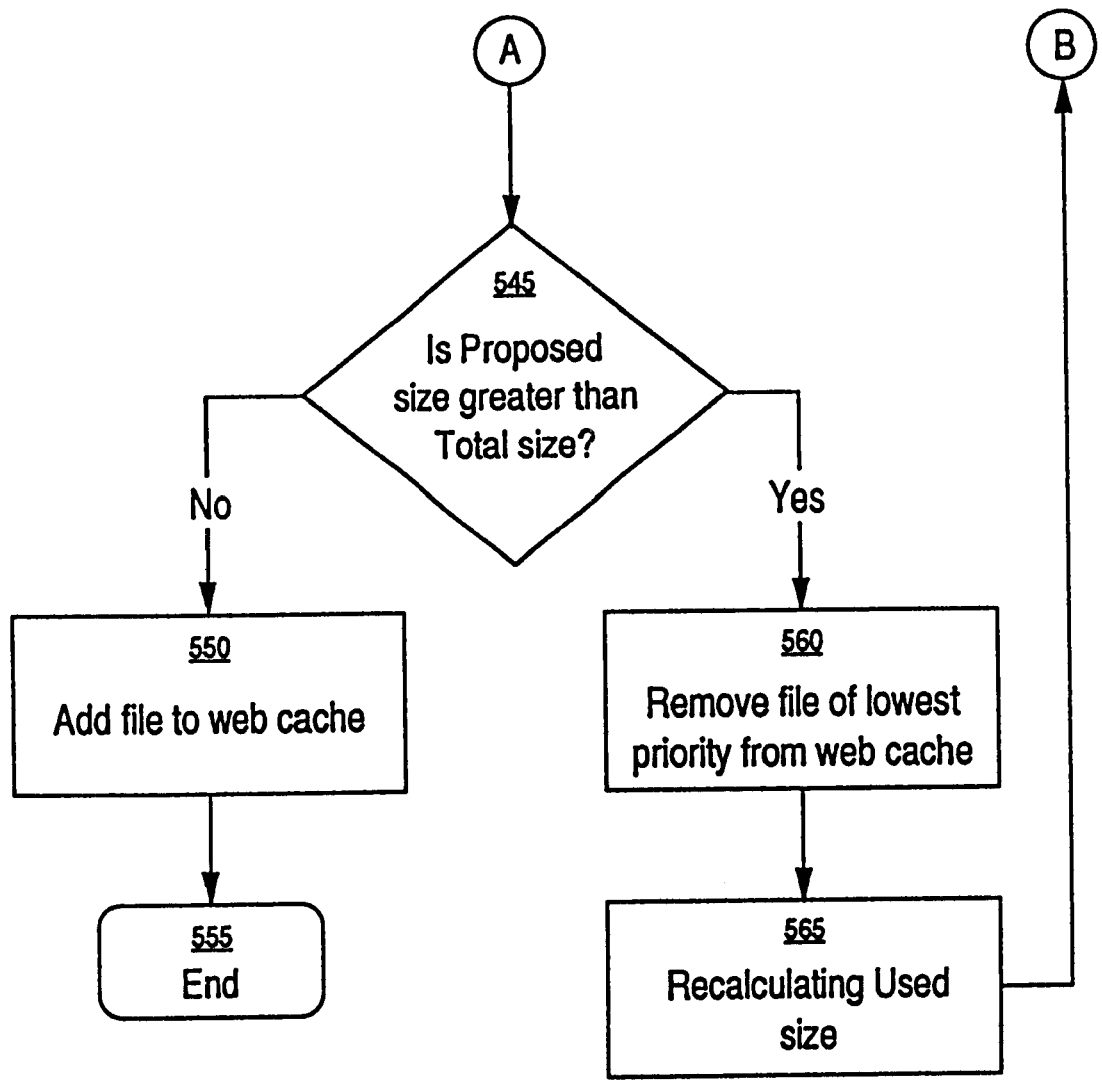

FIGS. 5A and 5B show a flowchart diagram of a process 500 for replacement of files in a web cache in accordance with one embodiment of the present invention.

Referring first to FIG. 5A, at step 505, process 500 begins. At step 510, a file is requested from the web cache. Each file in the web cache has a priority, wherein the priority is previously determined by a process for determining the priority of a file in a web cache. (e.g., process 300 of FIG. 3 or process 400 of FIG. 4).

At step 515, it is determined whether the requested file is in the web cache. If the file is in the web cache, as shown at step 520, the file is served out of cache.

At step 525, the priority of the requested file is updated by process 300 of FIG. 3 or process 400 of FIG. 4. In one embodiment, the clock value does not change, the frequency is increased by one, the priority is updated using process 300 or process 400, and the file is moved accordingly in the queue.

At step 530, process 500 stops as there is no need to replace any files in the web cache because the requested file was in the web cache.

If the requested file is not in the web cache, it must be determined whether or not to cache the file. To perform this determination, as shown at step 535, the priority of the requested file is calculated where the frequency is set to one, the priority is calculated according to process 300 of FIG. 3 or process 400 of FIG. 4, and the file is enqueued accordingly.

In one embodiment of, as shown at step 540, the number of bytes (e.g., size) comprising the requested file is added to the Used size, which is the current size of the web cache (e.g., the number of bytes currently in stored in the web cache), resulting in a Proposed size of the web cache (e.g., the number of bytes in the web cache if the requested file is added to the web cache).

With reference now to FIG. 5B, at step 545, it is determined whether the Proposed size is greater than the Total size, wherein the Total size is the maximum size of the web cache (e.g., the maximum number of bytes that can be stored in the web cache).

If the Proposed size is not greater than the Total size of the web cache, as shown at step 550, the requested file is added to the web cache. At step 555, process 500 ends because there is no need to replace any files currently in the web cache.

If the Proposed size is greater than the Total size of the web cache, as shown at step 560, the requested file does not fit in the cache, so files must be evicted. In one embodiment, the file with the lowest priority, as calculated previously, is evicted.

At step 565, the Used size of the web cache is recalculated, accounting for the eviction of the file of lowest priority. Process 500 then returns to step 540 of FIG. 5A. Steps 540 through 565 are repeated until the proposed size is not greater than the maximum size, as shown at step 550.

In another embodiment, upon a file f being requested, the web cache replacement policy is as follows:

If the request for f is a hit, f is served out of cache and:
1. Used and Clock do not change, wherein Used represents the number of bytes stored in the web cache and Clock represents the clock value;
2. Fr(f) is increased by one, wherein Fr(f) represents the frequency of access of the requested file; and
3. Pr(f) is updated using Equation 1 or Equation 2 and f is moved accordingly in the queue, wherein Pr(f) represents the priority of the file.

If the request for f is a miss, it must be determined whether to cache f or not. To perform this determination:
a) Fr(f) is set to one;
b) Pr(f) is computed using Equation 1 or Equation 2 and f is enqueued accordingly; and
c) Used is increased by Size(f), wherein Size(f) represents the size of the requested file.

Then, one of the following two situations takes place:
a) If Used≦Total, file f is cached, completing the updates, wherein Total represents the maximum size of the web cache.
b) If Used>Total, not all files fit in the cache. First, the smallest set $\{f_1, f_2, \ldots f_k\}$ of files to evict which have the lowest priority are identified, and Used$-\Sigma_{i=1}^{k}$Size$(f_i)$≦Total is satisfied. Then:
  a) If f is not among $f_1, f_2, \ldots f_k$:
    b) Clock is set to $\max_{i=1}^{k} \text{Pr}(f_i)$;
    c) Used is decreased by $\Sigma_{i=1}^{k}$Size$(f_i)$;
    d) $f_1, f_2, \ldots f_k$ are evicted; and f is cached.
  b) If f is instead among $f_1, f_2, \ldots f_k$, it is simply not cached and removed from the priority queue, while none of the files already in the cache is evicted. This happens when the value of Pr(f) is so low that it would put f (if cached) among the first candidates for replacement (e.g., when the file size is very large—thus the proposed procedure will automatically limit the cases when such files are cached.

The preferred embodiment of the present invention, a method for determining the priority of a file in a web cache, is thus described. While the present invention has been described in particular embodiments, it should be appreciated that the present invention should not be construed as limited by such embodiments, but rather construed according to the below claims.

What is claimed is:

1. A method for determining the priority of a file in a web cache comprising the computer-implemented steps of:
   a) determining a frequency based on how many times said file has been accessed since it was stored in said web cache;
   b) determining a size based on how many bytes comprise said file; and
   c) determining said priority using a ratio of said frequency raised to a first value to said size raised to a second value, wherein said first value and said second value are rational numbers other than one.

2. The method as recited in claim 1 wherein said priority is determined by adding said ratio to a clock value, wherein said clock value is a running counter associated with said file, said clock value starting at the time said file was stored in said web cache.

3. The method as recited in claim 2 wherein said priority is determined by adding said ratio, said clock value, and said frequency.

4. The method as recited in claim 3 wherein said frequency raised to said first value equals one such that said ratio is one to size raised to a second value.

5. The method as recited in claim 2 wherein said clock value can be set to any monotonically increasing function to accommodate different aging mechanisms.

6. The method as recited in claim 1 wherein said first value is greater than one.

7. The method as recited in claim 1 wherein said second value is less than one.

8. A computer-usable medium having computer-readable program code embodied therein for causing a computer system to perform the steps of:
   a) determining a frequency based on how many times file has been accessed since it was stored in said web cache;
   b) determining a size based on how many bytes comprise said file; and
   c) determining said priority using a ratio of said frequency raised to a first value to said size raised to a second value, wherein said first value and said second value are rational numbers other than one.

9. The computer-usable medium as recited in claim 8 wherein said priority is determined by adding said ratio to a clock value, wherein said clock value is a running counter associated with said file, said clock value starting at the time said file was stored in said web cache.

10. The computer-usable medium as recited in claim 9 wherein said priority is determined by adding said ratio, said clock value, and said frequency.

11. The computer-usable medium as recited in claim 10 wherein said frequency raised to said first value equals one such that said ratio is one to size raised to a second value.

12. The computer-usable medium as recited in claim 9 wherein said clock value can be set to any monotonically increasing function to accommodate different aging mechanisms.

13. The method as recited in claim 8 wherein said first value is greater than one.

14. The method as recited in claim 8 wherein said second value is less than one.

15. A method for replacement of files in a web cache comprising the computer-implemented steps of:
   a) requesting a file from said web cache, said web cache comprising at least one file, said web cache having a total size and a used size, wherein said total size is the number of bytes said web cache can store, wherein said used size is the number of bytes currently being stored by said web cache, each file having a priority, said priority determined by the steps of:
      a1) determining a frequency based on how many times said cached file has been accessed since it was stored in said web cache;
      a2) determining a size based on how many bytes comprise said cached file; and
      a3) determining said priority using a ratio of said frequency raised to a first value to said size raised to a second value, wherein said first value and said second value are rational numbers other than one;
   b) provided said file is located in said web cache, serving said file out of said web cache and updating said priority;
   c) provided said file is not located in said web cache, determining whether to store said file in said web cache by performing the steps of:
      c1) adding a file size of said file to said used size, resulting in a first value;
      c2) provided said first value is less than said total size, adding said file to said web cache;
      c3) provided said first value is greater than said total size, removing at least one of said files according to said priority until said used size is less than said total size; and
   d) storing said file into said web cache.

16. The method as recited in claim 15 wherein said priority is determined by adding said ratio to a clock value, wherein said clock value is a running counter associated with said file, said clock value starting at the time said file was stored in said web cache.

17. The method as recited in claim 16 wherein said priority is determined by adding said ratio, said clock value, and said frequency.

18. The method as recited in claim 17 wherein said frequency raised to said first value equals one such that said ratio is one to size raised to a second value.

19. The method as recited in claim 16 wherein said clock value can be set to any monotonically increasing function to accommodate different aging mechanisms.

20. The method as recited in claim 15 wherein said first value is greater than one.

21. The method as recited in claim 15 wherein said second value is less than one.

22. A computer-usable medium having computer-readable program code embodied therein for causing a computer system to perform the steps of:
   a) requesting a file from a web cache, said web cache comprising at least one file, said web cache having a total size and a used size, wherein said total size is the number of bytes said web cache can store, wherein a used size is the number of bytes currently being stored by said web cache, each file having a priority, said priority determined by the steps of:
      a1) determining a frequency based on how many times said cached file has been accessed since it was stored in said web cache;
      a2) determining a size based on how many bytes comprise said cached file; and
      a3) determining said priority using a ratio of said frequency raised to a first value to said size raised to a second value, wherein said first value and said second value are rational numbers other than one;
   b) provided said file is located in said web cache, serving said file out of said web cache and updating said priority;
   c) provided said file is not located in said web cache, determining whether to store said file in said web cache by performing the steps of:
      c1) adding a file size of said file to said used size, resulting in a first value;
      c2) provided said first value is less than said total size, adding said file to said web cache;
      c3) provided said first value is greater than said total size, removing at least one of said files according to said priority until said used size is less than said total size; and
   d) storing said file into said web cache.

23. The computer-usable medium as recited in claim 22 wherein said priority is determined by adding said ratio to a clock value, wherein said clock value is a running counter associated with said file, said clock value starting at the time said file was stored in said web cache.

24. The computer-usable medium as recited in claim 23 wherein said priority is determined by adding said ratio, said clock value, and said frequency.

25. The computer-usable medium as recited in claim 24 wherein said frequency raised to said first value equals one.

26. The computer-usable medium as recited in claim 23 wherein said clock value can be set to any monotonically increasing function to accommodate different aging mechanisms.

27. The computer-usable medium as recited in claim 22 wherein said first value is greater than one.

28. The computer-usable medium as recited in claim 22 wherein said second value is less than one.

29. A method for determining the priority of a file in a web cache, wherein said priority is calculated according to $$Pr(f) = \frac{Fr(f)^\alpha}{Size(f)^\beta};$$

wherein said Pr(f) is said priority of said file;
wherein said Fr(f) is the number of times said file has been accessed since it was stored in said web cache;
wherein said Size(f) is the number of bytes comprising said file;
wherein said $\alpha$ is a rational number other than one; and
wherein said $\beta$ is a rational number other than one.

30. The method as recited in claim 29 wherein said priority is calculated according to $$Pr(f) = Clock + \frac{Fr(f)^\alpha}{Size(f)^\beta};$$

wherein said Clock is a running counter associated with said file, said Clock starting at the time said file was stored in said web cache.

31. The method as recited in claim 30 wherein said Clock can be set to any monotonically increasing function to accommodate different aging mechanisms.

32. The method as recited in claim 29 wherein said $\alpha$ is greater than one.

33. The method as recited in claim 29 wherein said $\beta$ is less than one.

* * * * *